United States Patent [19]

Lusk

[11] Patent Number: 4,572,027
[45] Date of Patent: Feb. 25, 1986

[54] MOTION CONVERTER

[76] Inventor: Kenneth P. Lusk, 816 Ward St., Ridgecrest, Calif. 93555

[21] Appl. No.: 611,896

[22] Filed: May 18, 1984

[51] Int. Cl.⁴ .......................... F16H 5/70; F16H 17/00
[52] U.S. Cl. .......................................... 74/812; 74/88; 74/126; 74/204
[58] Field of Search ................. 74/810, 812, 380, 384, 74/385, 88, 126, 202, 204, 206, 208, 209

[56] References Cited

U.S. PATENT DOCUMENTS

| 637,015 | 11/1899 | O'Donnell | 74/204 |
| 668,914 | 2/1901 | French | 74/204 |
| 778,855 | 1/1905 | Goldmann | 74/134 |
| 891,108 | 6/1908 | Smith | 74/204 |
| 2,038,082 | 4/1936 | Lazich | 74/812 |
| 2,184,958 | 12/1939 | Goddard | 74/204 |
| 2,587,038 | 2/1952 | Goodell | 74/812 |
| 2,625,698 | 1/1953 | De Kadt et al. | 74/204 |
| 2,751,028 | 6/1956 | Laughlin | 74/202 |
| 3,323,392 | 6/1967 | Lalesse | 74/812 |
| 3,528,309 | 9/1970 | Laybourn | 74/812 |
| 3,666,063 | 5/1972 | Schoeman et al. | 74/812 |
| 3,799,005 | 3/1974 | Koehler | 74/812 |

FOREIGN PATENT DOCUMENTS

| 412283 | 4/1925 | Fed. Rep. of Germany | 74/367 |
| 1082091 | 5/1960 | Fed. Rep. of Germany | 74/204 |
| 526871 | 1/1866 | Japan | 74/812 |
| 868689 | 5/1961 | United Kingdom | 74/202 |

Primary Examiner—Lawrence J. Staab
Attorney, Agent, or Firm—Baker & Houston

[57] ABSTRACT

Apparatus for converting multi-directional input to uni-directional output having a plurality of drivers rotated by the input and moveable to alternate positions with respect to opposed surfaces on the output driven member for frictional drive of the driven member. The drivers are moved to alternate positions automatically upon change of direction of the input.

4 Claims, 5 Drawing Figures

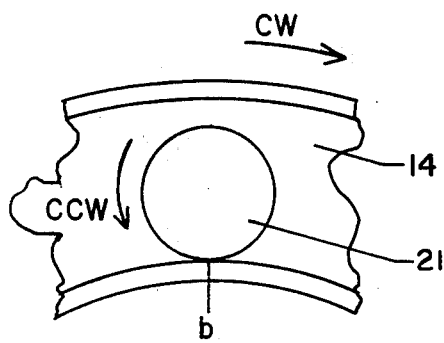
FIG. 2
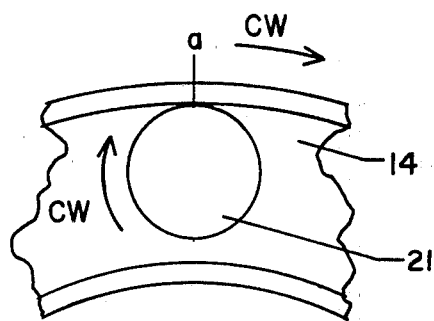
FIG. 3
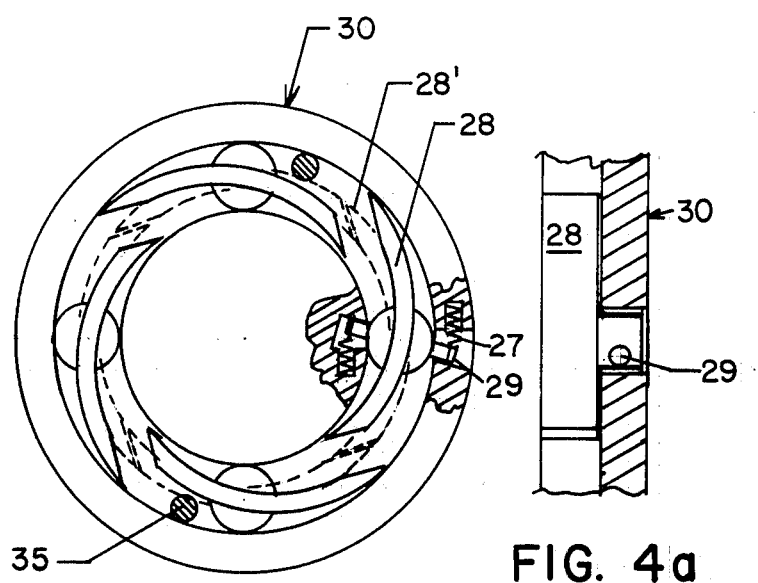
FIG. 4
FIG. 4a

MOTION CONVERTER

SUMMARY OF THE INVENTION

This invention relates to a power unit for converting a multi-directional input such as oscillatory or reciprocatory motion into a uni-directional output rotation.

The invention utilizes a unique coupling between coaxial input and output shafts wherein a slotted toroidal tubular driven member is caused to rotate by frictional drive members within the tube. The drive members are shifted to contact the inner walls of the tube on opposite sides at alternate times depending upon the direction of rotation of the drive means. This results in a smooth transition of alternate rotary motion into uni-directional rotary motion.

The term "frictional" is not intended to be limited to the contact of drive surfaces but also to include magnetic or hydraulic interaction between surfaces adapted for that purpose.

A wide variety of motion conversion devices have been shown and described in prior publications and patents. One such device is the subject of U.S. Pat. No. 3,666,063 issued May 30, 1972 to Schoeman et al. This device utilizes conventional uni-directional clutches alternately operable to provide uni-directional output from a multi-directional input.

The uses to which such a motion converter may be put are many and varied and a number of examples appear in the above cited U.S. Patent, Column 1, paragraph 3, lines 15-26 and the same is hereby incorporated by reference. Obvious uses include the conversion into rotational power of the energy of the rise and fall of water, for example, and the motion of certain pedal operated vehicles.

In the present invention the multi-directional torque of an input shaft is transferred to a plurality of stub shafts pivoted in toward the input shaft or out away from the input shaft, depending on the direction of rotation. On the outboard end of each of these shafts is a frictional drive member. The frictional drive members are enclosed within a toroidal driven member attached to the output shaft. The drive members are tilted inwardly or outwardly depending upon the direction of rotation of the input shaft and in the inward position contact the inner portion of the driven member and in the outer position contact the outer portion of the driven member. This action results in the driving of the driven member in a uni-directional manner.

BRIEF DESCRIPTION OF THE SEVERAL VIEWS OF THE DRAWINGS

FIG. 2 is a schematic representation of a view taken along line II—II of FIG. 1;

FIG. 3 is a view similar to that in FIG. 2 with parts in an alternative position;

FIG. 4 is a cross-sectional view of a portion of the device taken along line IV—IV; and FIG. 4a is an enlarged detail of the portion shown in FIG. 4.

DETAILED DESCRIPTION

Figure 1:
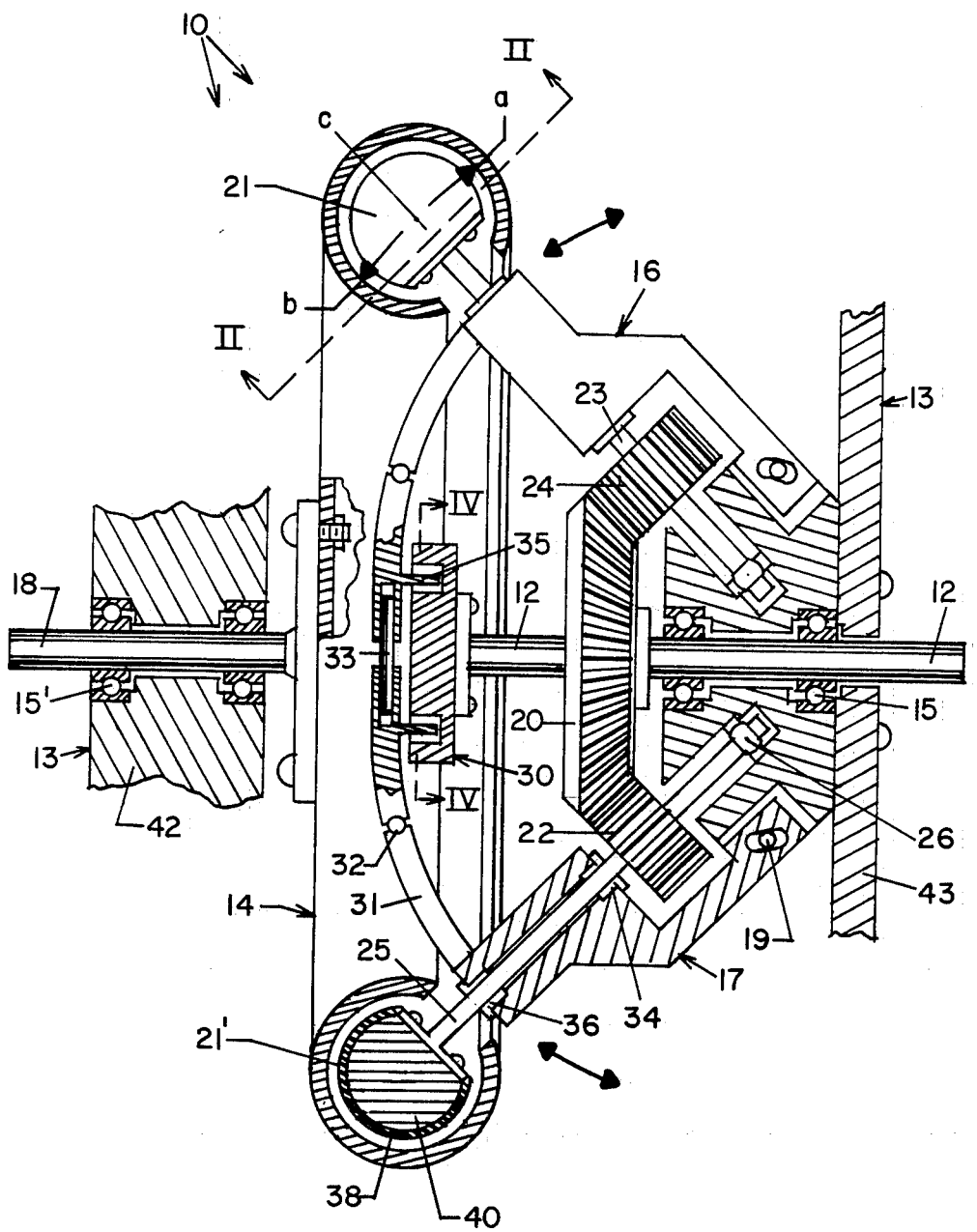
FIG. 1 is a plan view of the device according to the invention partly in section and with parts broken away for clarity.

FIG. 1 on the drawing illustrates an embodiment of the invention wherein the overall apparatus is indicated generally by the numeral 10. In this embodiment, an input shaft 12 is shown mounted in a frame 13 coaxial with a driven member 14 and a plurality of intermediate drive assemblies represented by 16 and 17. Driven member 14 is shown as a hollow toroidal flywheel mounted on the output shaft 18 which is also coaxial with shaft 12. Shafts 12 and 18 are mounted for rotation in frame 13 by bearings 15,15' respectively.

Each of the drive assemblies 16 and 17 are pivotal between inner and outer positions limited by a pin 19. Power from rotation of shaft 12 is imparted to shaft 18 by means of a transmission including bevel gear 20 which meshes with pinions 22,24 on stub shafts 23,25. Drive members 21,21', shown here as spherical wheels, are attached to stub shafts 23,25 and these wheels are captive within the flywheel driven member 14. Each of the stub shafts 23,25 are journaled in bearings as shown at 34,36 and pivotal about a spherical bearing such as 26.

A reversing mechanism 30 is mounted on the inner end of input shaft 12 and is connected to drive assemblies 16,17 by means of pivotal joints or hinges 32 between elements of arms 31 and the arms are centrally connected by a connecting pin 33 which is slidably fitted within respective ends of arms 31. Mounted on the outer end of each of stub shafts 23,25 are spherical drive members 21,21'. The reversing mechanism 30 causes motion of the drive assemblies and their respective stub shafts inwardly and outwardly as shown by the arrows in FIG. 1.

Outward movement of the drive assemblies 16,17 will cause spherical drive wheels 21,21' to engage the inside surface of flywheel 14 at point A and inward movement will cause engagement at point B, as shown by the arrows in FIG. 1 with respect to drive wheel 21'. The inward and outward movement of arms of drive assemblies 16,17 is caused to occur automatically upon change of direction of rotation of shaft 12 by means of a reversing mechanism such as that indicated at 30.

Reversing mechanism 30 is channeled to receive pins 35 which are attached to arms 31. (see also FIGS. 2, 3, 4 and 4a) Fitted within the channel in mechanism 30 are a plurality of baffle members 28 which may be moved from the solid line position indicated at 28 to the dotted line position 28' against the bias of springs 27 acting on limiting pins 29.

Clockwise rotation of mechanism 30 as shown in FIG. 4 will cause pins 35 to be confined to an outer path by baffles 28 and counter clockwise rotation will cause the pins to move to an inner path against springs 27.

Counterclockwise rotation will thus result in inward movement of drive wheels 21,21' to contact surface b of flywheel 14 as seen in FIG. 2 with respect to wheel 21. Clockwise rotation will result in outward movement of drive assemblies 16, 17, and drive wheels 21, 21' will make drive contact at point a as shown in FIG. 3. In either instance clockwise rotation of flywheel 14 results.

The drive wheels 21,21' preferably comprise a coating 38 of flexible, resilient material bonded to hubs 40 which are removably attached to stub shafts 23.

I claim:

1. Apparatus for converting reciprocating or oscillating motion to uni-directional motion including:
   a frame;
   first and second coaxial shafts rotatably mounted in said frame;
   drive means mounted on one end of said first shaft and means on one end of said second shaft in juxtaposition to said drive means operable to partake of driving forces generated by said drive means;

said drive means cooperating with a plurality of rotatable stub shafts, journalled in said frame for limited pivotal movement about one end and having a driving member on the opposite end thereof, wherein such cooperation between said first shaft and said stub shafts, imparts proportional rotation to said stub shafts upon rotation of said first shaft in either direction;

said driving members on said stub shafts cooperating with said means on said second shaft to impart driving forces thereto; and shifting means cooperating with said stub shafts to cause said stub shafts to pivot from a first position to a second position as said first shaft changes direction of rotation;

whereby, rotation of said first shaft in either direction will impart uni-directional motion to said second shaft;

means on said second shaft compromising a hollow torroidal body slotted on a surface opposite said first shaft and wherein said driving means on said stub shafts comprise spherical ends faced with frictional materials.

2. Apparatus according to claim 1 wherein said first shaft carries a bevel gear and each stub shaft carries a pinion mating with said bevel gear.

3. Apparatus according to claim 2 wherein said shifting means include a reversing mechanism on said first shaft cooperating with arm members associated with each said stub shaft to cause said pivoting of said stub shafts.

4. Apparatus according to claim 1 wherein said shifting means include a reversing mechanism on said first shaft cooperating with arm members associated with each said stub shaft to cause said pivoting of said stub shafts.

* * * * *